(12) United States Patent
Cote

(10) Patent No.: US 9,720,393 B2
(45) Date of Patent: Aug. 1, 2017

(54) AUTOMATION SYSTEM AND METHOD OF MANUFACTURING PRODUCT USING AUTOMATED EQUIPMENT

(71) Applicant: P.C. Automax inc., Sherbrooke (CA)

(72) Inventor: Pierre E Cote, Sherbrooke (CA)

(73) Assignee: P.C. Automax inc., Sherbrooke, QC (CA)

( * ) Notice: Subject to any disclaimer, the term of this patent is extended or adjusted under 35 U.S.C. 154(b) by 0 days.

(21) Appl. No.: 14/374,947

(22) PCT Filed: Feb. 27, 2014

(86) PCT No.: PCT/CA2014/050144
§ 371 (c)(1),
(2) Date: Jul. 28, 2014

(87) PCT Pub. No.: WO2014/138949
PCT Pub. Date: Sep. 18, 2014

(65) Prior Publication Data
US 2016/0033962 A1 Feb. 4, 2016

Related U.S. Application Data

(63) Continuation-in-part of application No. 14/013,210, filed on Aug. 29, 2013, now abandoned.
(Continued)

(30) Foreign Application Priority Data

Aug. 31, 2012 (CA) ...................................... 2788550

(51) Int. Cl.
*G05B 17/02* (2006.01)
*G05B 19/418* (2006.01)

(52) U.S. Cl.
CPC ....... *G05B 17/02* (2013.01); *G05B 19/41885* (2013.01); *G05B 2219/32342* (2013.01); *G05B 2219/32385* (2013.01); *Y02P 90/26* (2015.11)

(58) Field of Classification Search
CPC .. G05B 17/00; G05B 17/02; G05B 19/41885; G05B 2219/32385; G05B 2219/32342; Y02P 90/26
See application file for complete search history.

(56) References Cited

U.S. PATENT DOCUMENTS 4,249,238 A  2/1981  Spang, III et al.
4,704,685 A  11/1987  Martinsons et al.
(Continued)

OTHER PUBLICATIONS

Gregg Ekberg and Bruce H. Krogh, Programming Discrete Control Systems Using State Machine Templates, Discrete Event Systems, 2006 8th International Workshop, Jul. 10-12, 2006.
(Continued)

*Primary Examiner* — Kamini S Shah
*Assistant Examiner* — Jay B Hann
(74) *Attorney, Agent, or Firm* — Anglehart et al.

(57) ABSTRACT

An automated control of a system having a plurality of cooperating components involving controlled elements and sensors uses a simulator configured to simulate operation of the components. The simulator stores data representing states of the components and modifies the states over time in accordance with simulated operation of the system. An input module receives data from at least the sensors and updates in the simulator the data representing states of the components. An output module reads from the simulator the data representing states of the components and generates at least controlled element control signals for the controlled elements of the components. The simulator contains a virtual state machine representing the system, and automation of
(Continued)

the system is achieved without state machine logic representing the system within the input module and the output module.

15 Claims, 5 Drawing Sheets

Related U.S. Application Data

(60) Provisional application No. 61/802,287, filed on Mar. 15, 2013.

(56) References Cited

U.S. PATENT DOCUMENTS

| | | | |
|---|---|---|---|
| 4,773,213 A | 9/1988 | Krukoski et al. | |
| 5,574,645 A | 11/1996 | Meeker et al. | |
| 5,818,736 A | 10/1998 | Leibold | |
| 5,870,692 A | 2/1999 | Millo | |
| 6,161,051 A * | 12/2000 | Hafemann | G05B 19/41885 700/17 |
| 6,643,555 B1 | 11/2003 | Eller et al. | |
| 6,725,402 B1 * | 4/2004 | Coss, Jr. | G05B 19/41875 700/109 |
| 6,772,082 B2 | 8/2004 | van der Geest et al. | |
| 7,142,943 B2 * | 11/2006 | Groll | G05B 19/05 700/169 |
| 7,266,476 B2 | 9/2007 | Coburn et al. | |
| 7,269,464 B2 | 9/2007 | Phillips et al. | |
| 7,308,327 B2 | 12/2007 | Coburn et al. | |
| 7,539,593 B2 | 5/2009 | Machacek | |
| 7,565,660 B2 | 7/2009 | Martin | |
| 7,647,126 B2 | 1/2010 | Blevins et al. | |
| 7,702,491 B2 | 4/2010 | Walacavage et al. | |
| 7,809,534 B2 | 10/2010 | Sturrock et al. | |
| 7,957,942 B2 | 6/2011 | Ivchenko et al. | |
| 7,974,828 B2 | 7/2011 | Okamura et al. | |
| 7,987,305 B2 | 7/2011 | Blair et al. | |
| 7,996,113 B2 | 8/2011 | Yuan et al. | |
| 8,019,447 B2 | 9/2011 | Hoisington et al. | |
| 8,078,357 B1 | 12/2011 | Trytten et al. | |
| 8,108,191 B1 | 1/2012 | Britch | |
| 8,127,241 B2 | 2/2012 | Blevins et al. | |
| 8,131,392 B2 | 3/2012 | Kersavage et al. | |
| 8,135,481 B2 | 3/2012 | Blevins et al. | |
| 8,396,582 B2 | 3/2013 | Kaushal et al. | |
| 2002/0128810 A1 | 9/2002 | Craig et al. | |
| 2002/0193972 A1 * | 12/2002 | Kudo | G05B 19/41885 703/1 |
| 2004/0148037 A1 | 7/2004 | Frampton et al. | |
| 2005/0071802 A1 | 3/2005 | Brakelmann et al. | |
| 2005/0090929 A1 | 4/2005 | Dolansky et al. | |
| 2006/0241841 A1 | 10/2006 | Brunstetter | |
| 2007/0093941 A1 | 4/2007 | Lizotte et al. | |
| 2007/0233452 A1 | 10/2007 | Sasaki | |
| 2008/0091394 A1 | 4/2008 | Hahn et al. | |
| 2009/0089031 A1 * | 4/2009 | Sturrock | G05B 17/02 703/7 |
| 2009/0089700 A1 * | 4/2009 | Gu | G05B 19/41885 715/771 |
| 2011/0231176 A1 | 9/2011 | Sagues | |
| 2012/0022673 A1 | 1/2012 | Heller et al. | |
| 2012/0022849 A1 | 1/2012 | Wang et al. | |
| 2012/0330452 A1 | 12/2012 | Guenther et al. | |

OTHER PUBLICATIONS

Manual of Siemens Simatic S7-Higraph V5.3, Oct. 2004, Designing a program using the example of a drill.
PCT/CA2014/050144 International search report.
PCT/CA2014/050144 Written opinion.

* cited by examiner

AUTOMATION SYSTEM AND METHOD OF MANUFACTURING PRODUCT USING AUTOMATED EQUIPMENT

This invention claims priority of U.S. provisional patent application Ser. No. 61/802,287, filed Mar. 15, 2013, and is a continuation-in-part of U.S. patent application Ser. No. 14/013,210 filed Aug. 29, 2013, now pending, claiming priority to Canadian patent application 2,788,550, filed Aug. 31, 2012, the contents of which are hereby incorporated by reference.

TECHNICAL FIELD

The present application relates to the field of automation and to manufacturing of unit products using automated machinery or equipment.

BACKGROUND

Quite often in the field of industrial automation and manufacturing, within a given factory or plant, a technician or engineer is typically entrusted to oversee the operation of one or more production lines and repair any process-related problems that might result. Such ability invariably requires a high level of skill. Likewise, whenever a problem does occur, whether major or minor, it is typically necessary to halt operation on said production line, carry out a thorough or cursory examination of the situation, apply a workaround or long-term solution, and restart the production line once again. This often requires considerable investments of time, effort, and money.

In many cases, the nature of the products created on the production line whose operation is interrupted in this way is such that resuming the manufacture of such "partially-formed" products may not be done easily or at all following interruption on such a line, even if the original problem was fully resolved. Thus, in such cases, the products being manufactured or the operation underway is typically unable to recover, and the entire contents of the system typically need to be emptied, and restarted from scratch. The process engendered by this state of affairs which tolerates no error, pause or downtime, represents an unnecessary overhead of time money and wasted supplies. The cost of such interruption, both direct and indirect, whether in terms of labor, and material waste in such cases, represent not only a strategic and logistical risk but also a significant financial liability to entities overseeing such automated manufacturing.

Industrial automation systems using sequential flow charts (SFCs) which involve programmable logic controllers are known in the art, but these systems typically lack the ability to halt (stop), adjust, resume, or restart an industrial automated assembly line following a malfunction or some other execution sequence interruption, and products that issue from such systems are typically of poor quality, or comparatively more costly to produce because of the costs associated with defective batches. No tolerance as to recovery functionality typically exists in industrial automation mechanisms currently, particularly those based on sequential flow charts (SFCs). Furthermore, SFC-based systems typically have a single initial state from which their execution begins, and this limitation underlies shortcomings involved with working with such systems.

Existing industrial automation systems dispatch explicit instructions to an automation system to bring about a pre-specified end or accomplish a specific result. However, said systems are limited by their own lack of awareness as to either the intrinsic state of the product that they are producing or the result they are intended to bring about. The steps that the system should take are expressed in largely monolithic and sequential steps, subject to an inflexible and predetermined procedure. Consider as an example, a bagel-making operation, a part of whose production, in such systems, be expressed using the following series of steps: "[ . . . ] turn on an oven, insert raw bagel into oven, wait 60 seconds, extract cooked bagel from oven [ . . . ]".

While in many cases, such a system achieves the result of producing bagels, no deeper information or intelligence about the process is known to the system. No information about the state of doneness is known at any intermediary point between the series of steps enumerated above. In such a scenario, a naïve operator's relative lack of knowledge on the state of doneness of the bagel, combined with his lack of knowledge as to the steps to take should a problem occur, makes continued use of such systems a safety, financial, supply, and operational liability.

One solution to the compound problem described above consists of stopping and resuming operation on such production lines and to do so with little to no time and/or material losses. A further solution would be for a human operator to accomplish this having little specialized knowledge, obviating in many cases higher labor costs and unrecoverable costs of discarded material. A further solution still would be to outfit the manufacturing line with the ability to avoid stopping altogether by anticipating and intelligently mitigating technical or other manufacturing deviations which in the current state of the art would require stopping.

A means by which to adequately manage and operate an industrial automation system which tolerates interruption (a system malfunction, for instance) is desperately needed. A means by which the above-mentioned shortcomings within existing systems may be overcome is described herein.

SUMMARY

Industrial automation systems have proliferated going back to the industrial revolution and especially with the rapid industrialization of the twentieth century. The need for continued productivity, whether measured in terms of cutting human labor costs, mitigating risk to humans, increasing production, or improving quality and precision, are all recurring aspects or consideration of automation. Automated systems and have numerous applications, a large number of which both make possible and sustain our modern way of life.

No system is perfect however, and real-world deployments of most manmade constructions sooner or later break down. The reasons for such breakdowns—sometimes short-lived, and other times permanent, are occasionally difficult to pinpoint; other times, failures may occur for clear intrinsic or extrinsic reasons.

In the case of automated systems, component or system-wide failures, whether temporary or permanent, are a known occurrence. It will be readily apparent to a person skilled in the art that an industrial automation system such as a production line located within a highly mechanized manufacturing environment will occasionally turn out rejected or defective products. This may occur as a result of a problem such as a defective component within the manufacturing environment. Alternatively, an issue with the product or in the materials used to create the product is at fault. In addition to the monetary cost of manufacturing and discarding a defective item or portion of a batch, in certain cases, such failures carry an additional logistical cost.

Such costs may in many cases be mitigated by a more intelligent management of the industrial automation environment, allowing for a potential defect to be prevented from ever occurring, or alternatively recovering an item or portion of a batch or lot that in the current state of the art must typically be discarded as a result of having to halt production on a given line. In the present state of the art, the ability to suspend automation of automated machinery, temporarily interrupting production, and then to resume operation, without having to discard most if not all of the products within the affected portion of a batch, represents an enormous advantage.

Embodiments of the invention disclosed herein describe the joint and simultaneous use of simulators, actuators, and control logic to achieve the same broad automation goal as systems known in the art, but to specifically accomplish said goals in a manner allowing for a product to be manufactured using automated machinery, components, and control logic that essentially appropriates the overwhelming majority of procedure and actions to perform, such as managing a bagel manufacturing system's response to the state of doneness of a bagel. The result is simplified operation for the operator, and the ability to recover should anything go wrong represents a cost, effort, and safety savings for the entity invested in the product.

The solution proposed herein describes a method of manufacturing products using automated machinery using one or more sensors to measure and quantify environmental conditions prevalent both within and around the system, in addition to enhancing said system with one or more simulators operative to accurately simulate the behavior and response of actuators, elements, or products within a given system. The solution also discloses the role and importance of the accompanying control logic to respond to the state of such simulators, and to direct the operation of other actors within the system. The ability of said simulators to accurately model the performance, response, and behavior of a given system (or subcomponent) and to match based on sensor-based inputs about the system and various aspects of its environment allows a previously unable system to be respond and recover following interruption in said systems' operation, with minimal or no negative side effect on the product resulting from the system or to the system itself.

BRIEF DESCRIPTION OF THE DRAWINGS

The invention will be better understood by way of the following detailed description of embodiments of the invention with reference to the appended drawings, in which.

DETAILED DESCRIPTION

Although the description provided herein discusses industrial automation and manufacturing in a broad sense, it will be appreciated that such discussion may apply to various applications within diverse sectors of industrial activity, of which a non-limited enumeration includes agriculture, mining, retail, home automation, packaging, material handling, and assembly lines.

Actuators of various types are key actors in different automation systems, as they are often employed to introduce specific types of motion within a system, such motion typically resulting from a set of one or more electrical signals, and typically directed to one or more types of controlled elements.

Within an automation context, including those enumerated herein, simulators are useful to model the behavior of actuators and other components configured within a real-world system. The modeling of such behavior is in turn useful to describe and predict the actions of said components within a given configuration. Simulators by their very nature include state observers, known in the art, the latter providing the actual value of the position of one or more components involved within a given system. Quite often, a known set of a component's behaviors and actions may be formalized as the set of that component's states. In an embodiment of the present invention, such states may be further formalized as state machines. In an embodiment, it is possible to specify that a component's position be set to the necessary working position for each said state. In an embodiment, information such as dead time may be included within a model.

While state observers and simulators may be equivalents in most cases, a simulator may in some cases have a distinct state observer. In an embodiment, a simulator may comprise state machines, if, for example said simulator models the behavior of discrete sensors. In order to follow the sequence of events of discrete sensors, the state observer may also confirm the operation state of said discrete sensors, and together with the state machine may validate whether such operation is consistent with expected or desired function.

Figure 1:
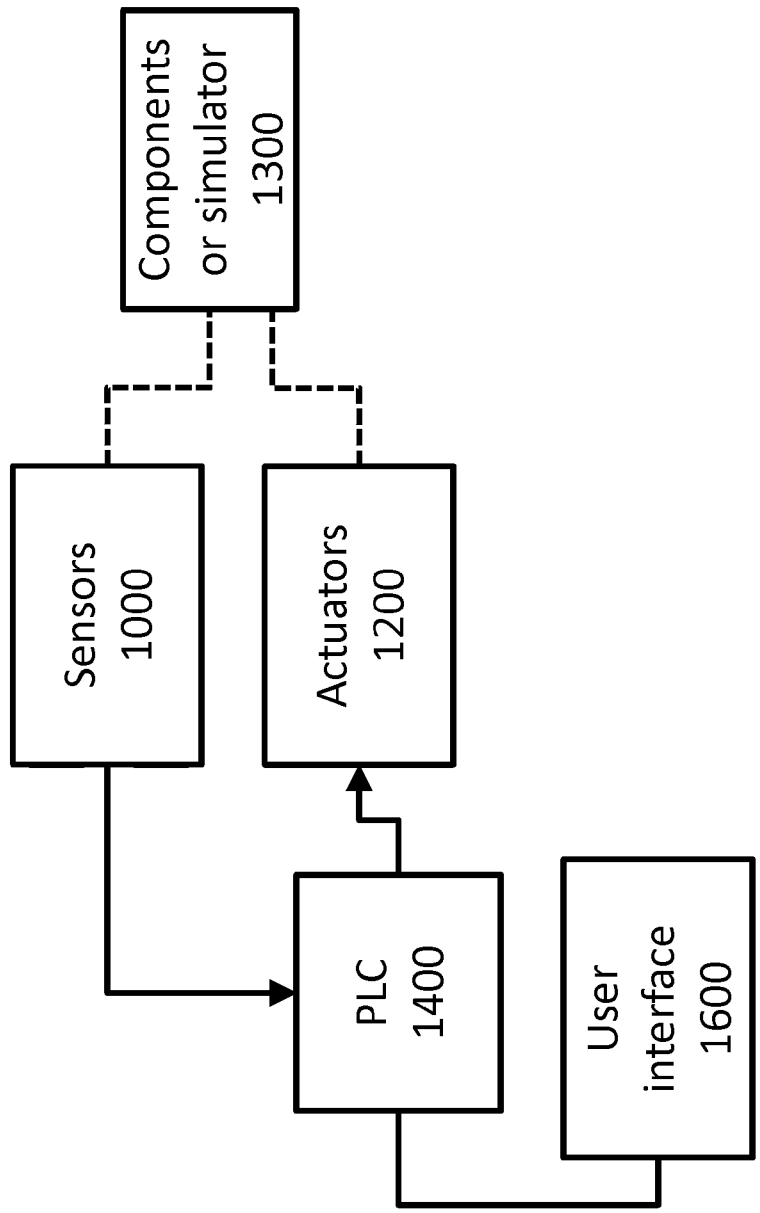
FIG. 1 is a basic prior art system wherein a programmable logic controller (PLC) feeds output to actuators, receives input from sensors, may include components or simulators of components to test the operation of the PLC, and a user operator interface to illustrate the status and events of the overall system.

With reference to FIG. 1, as is known in the art, testing of the programmable logic controller (PLC) 1400 can be done by connecting the actuator signals and providing the sensor signals from a simulator (1300) that was created for the purposes of design, evaluation, and/or teaching of a proposed automated system as a way of validating that the logic in the PLC 1400 matches with the evaluated design done using the simulator. As will be seen in the present disclosure as well as in FIG. 2, the Components or simulator module 1300 known in the art and shown in FIG. 1, may in some embodiments have a partial counterpart in the form of one or more components 2300.

Figure 2:
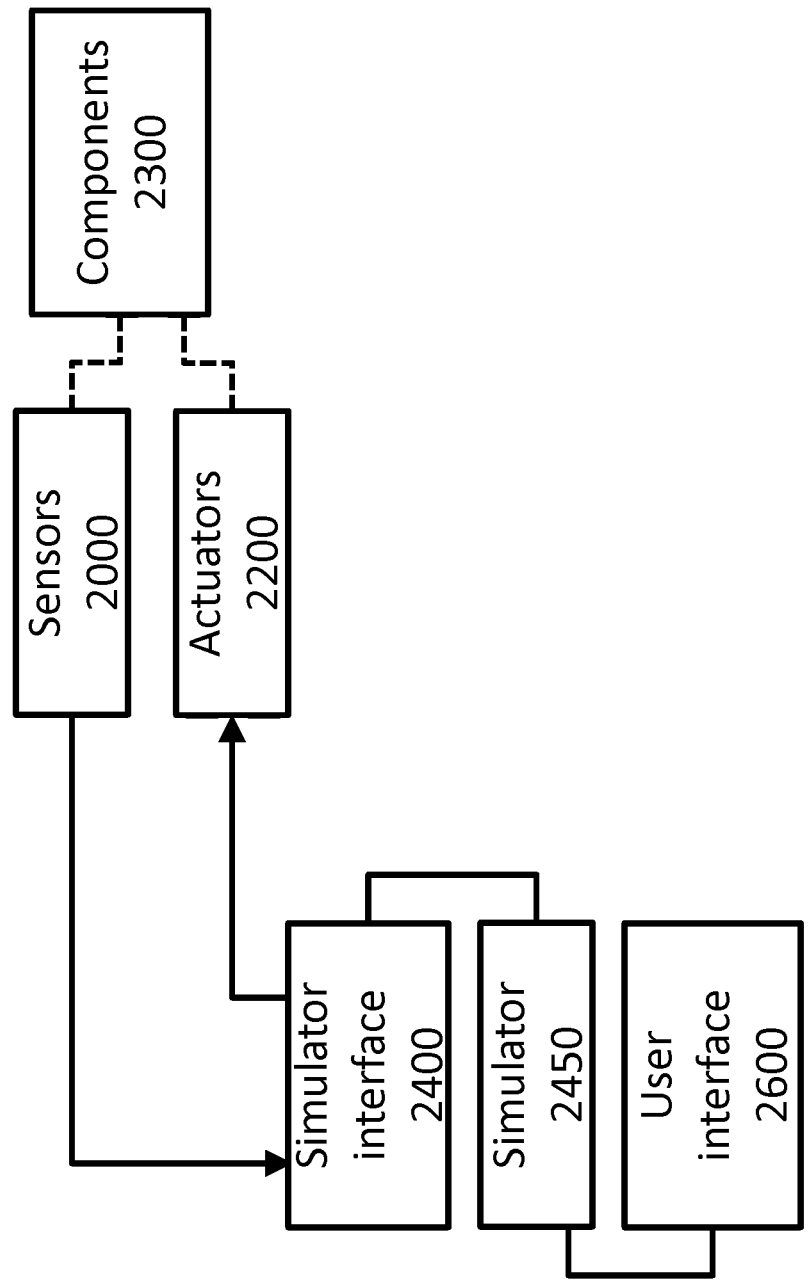
FIG. 2 is a basic layout of an embodiment of the present invention in which the relative interactions between a simulator, a synchronization interface, actuators, and sensors, are displayed; the foregoing layout showing how the simulator interface and simulator structurally replacing the traditional PLC shown in FIG. 1.

With reference to FIG. 2, an embodiment of the present invention includes a simulator 2450 whose function consists in part of imitating the operation of one or more actuators 2200 or processes within a real-world system and of using the latter simulator 2450 for purposes of control. Control logic for the actuators 2200 is implemented in the combination of the simulator 2450 and simulator interface 2400. Together, the components illustrated in FIG. 2 illustrate a simplified but operational embodiment of the present invention.

Offline Mode

In another embodiment of the present invention, it is possible to achieve a simulation-only mode, wherein the combination of the simulator interface 2400 and the simulator 2450 are physically disconnected from the sensors 2000 and actuators 2200. In such cases, each component within a system may continue to be simulated in accordance with said component's known and model behavior (further discussed herein), and by extension the entire system as well. However, owing to the fact that the sensors 2000 are disconnected in this mode of operation, said sensors 2000 do not supply any information to the simulator interface 2400 and ultimately to the simulator 2450. In another embodiment, the simulator interface 2400 might remain physically connected to actuators 2200 and still be able to generate signals that could potentially be delivered to the latter 2200, although such signals are not delivered and thus do not have any bearing on the set of actuators 2200 itself which is occasionally referred to as the real-world system to distinguish it from the simulator-only aspect. Likewise, since no sensor 2000 data is being received by the simulator interface 2400, the simulator is provided no knowledge as to whether (or by how much) to adjust any real-world component 2200, 2201, 2202, 2203 of the system. A similar mode may be achieved as shown in FIG. 3 where the Online/Offline module 2800 is set by a human operator via User interface 2600 to not transmit any simulator-derived 2451, 2452, 2453 data or states provided to Control logic 2470 to any of the Actuators 2201, 2202, 2203 within the system.

When operating in this mode, any existing external alarm signals (further discussed herein) or states that may be communicated by any component 2200, and/or product state are suppressed. In another embodiment, such component and product states include various settable alarm states whose purpose during regular operation is to warn a human operator of a loss or absence of sensor 2000 data to the simulator interface 2400. Once such alarm states are disabled, however, a purely simulated variant of the system's operation may proceed, and it will be appreciated that in an embodiment having a structure similar to that illustrated in FIG. 2 and in which a connection between the simulator interface 2400 its corresponding sensors 2000 and actuators 2200 is severed, the resulting system will operate using a reduced set of components, and its operation amounting to essentially that of a simulator.

Figure 3:
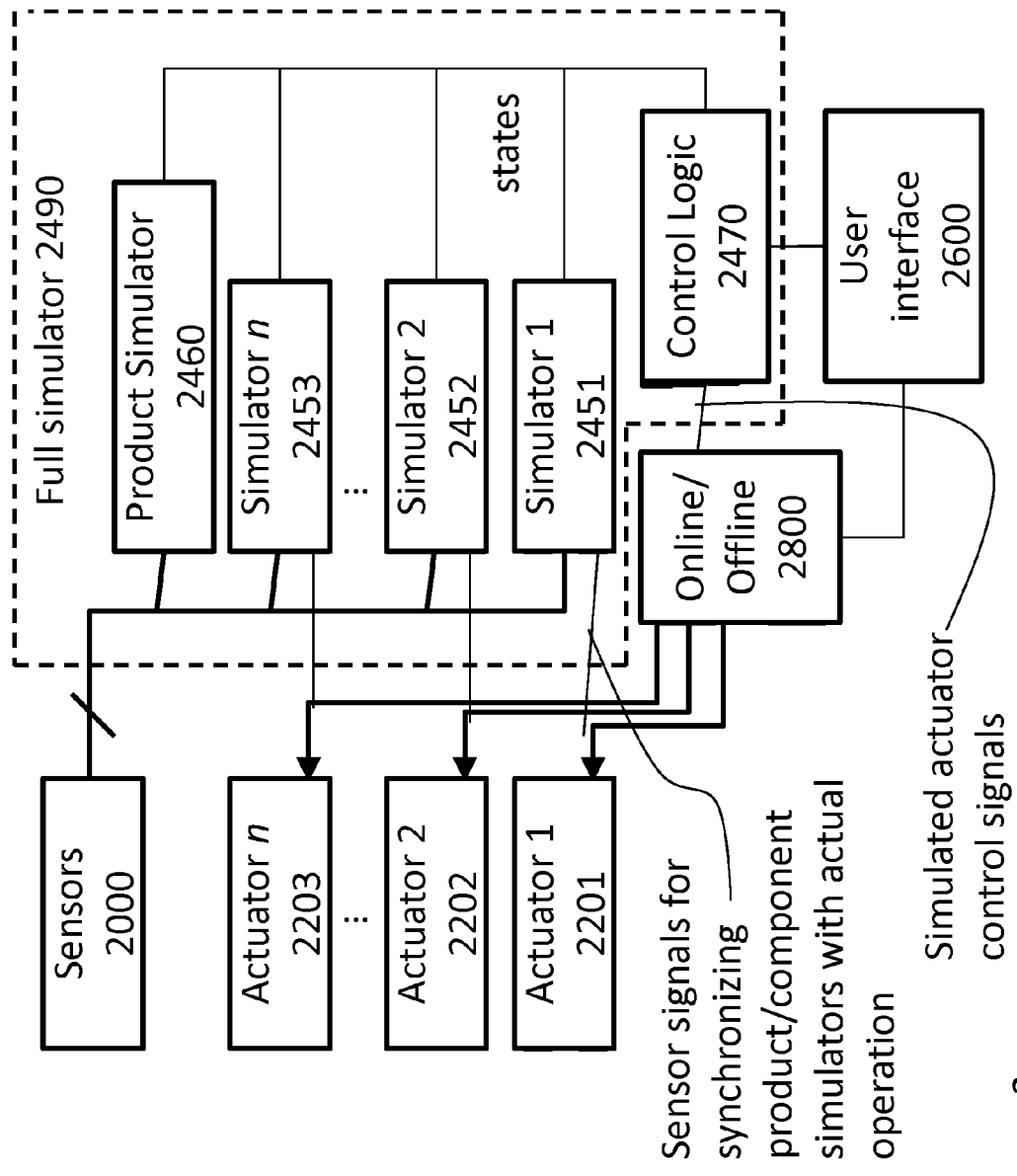
FIG. 3 is a more complex embodiment than that in FIG. 2, expanded to include multiple (linear) simulators, multiple actuators, multiple simulators for each component and product whose states are communicable to a system control logic module to form a full simulator, in addition to an online/offline toggle module and a user interface for each component, for each product, in addition to the system having control logic.

Consideration of FIG. 3 extends the concept further, illustrating the concept for multiple actuators 2201, 2202, 2203, within an embodiment of the invention which may be specified 2600 to operate in online or offline mode 2800. As in the case of FIG. 2, offline mode essentially prevents any signal provided by Control logic 2470 from being routed to any actuator within the system 2201, 2202, 2203.

Likewise, it will be appreciated that when operating in online mode, the linear simulators 2450 (FIG. 2); 2451, 2452, 2453 (FIG. 3) and product simulator(s) 2460, combined with control logic 2470 converts the result of simulations into electrical signals to drive a system's one or more actuators 2200, 2201, 2202, 2203. The group containing individual component simulators 2451, 2452, 2453 and product simulator 2460 also includes a control logic module 2470 within provides a synchronization interface between the simulated and real-world systems. The latter control logic module 2470 confers "full" simulator functionality 2490 to a system.

Accuracy in Modeling and Simulation

Accurate simulation of each actuator 2200, 2201, 2202, 2203, and indeed of each component whose operation is simulated within the system, is an important consideration in embodiments of the present invention. Accordingly, in an embodiment, a simulator module 2453 may typically simulate the position state of a corresponding component associated with one or more actuators 2203 within its respective system. In this context, the importance of accurately simulating said actuators' 2200, 2201, 2202, 2203 motion and position using linear models that, for example, integrate accelerations to give accurate velocity, or alternatively integrate velocity to give position will also be appreciated. In a similar vein, integrating heating power minus heating losses may be used to determine an accurate temperature value.

In some embodiments, a one-to-one correspondence may exist between an actuator 2203 and simulator 2453; in such cases, the operation of the former may be uniquely matched with the latter making the two direct counterparts. In other embodiments, a less strict correspondence may prevail; for example, one simulator may accurately model the behavior of one or more system components controlled by an actuator 2203, or vice versa. Broadening this notion to still other embodiments, a full simulator 2490, as illustrated in FIG. 3, which may include multiple linear simulators 2451, 2452, 2453 and which also combines control logic 2470, and one or more product simulators 2460 (to model the behavior of each item manufactured by or resulting from the system) may also be considered to model the behavior of the entire system or product as well.

Examples of actuator 2200, 2201, 2202, 2203 behavior modeled within a simulator 2450, 2451, 2452, 2453 are as broad, diverse, and scalable as the field and task to which an embodiment of the present invention may be applied. For example, an electrical motor may be one such actuator whose specific behavior, such as angular velocity in response to a range of input voltages, types of friction, and ambient temperatures is modeled and accordingly may be simulated by its corresponding simulator. Similarly, a factory conveyor, itself made up of several constituent parts or subassemblies may be collectively conceptualized and defined as another such actuator or component; here, such attributes as belt speed, particularly in response to various loads and/or materials may be one of several key attributes modeled by its simulator. It will be appreciated that the precise criteria by which to determine the extent, breadth, atomicity, or aggregate complexity of the subcomponent(s) of a system to simulate via a single simulator is an implementation consideration and will vary according to the needs of the embodiment of the present invention and the objective of the application to which said embodiment is applied.

In another embodiment, a similar concept regarding subassemblies may prevail, extending to the products manufactured themselves. In such cases, the data set for a product's state machine dataset may likewise be defined for each subassembly of a product to manufacture and likewise be connected to any component state.

Accordingly, the set of elements to be simulated is extended to include non-actuator components present within an embodiment of the present invention as well. Thus, an embodiment or system that outputs a given result or produces a product will typically have one or more product simulators 2460 to appropriately model attributes and other aspects of said product or result. In an embodiment, such modeling mirrors the evolution of the product as its manufacturing sequence unfolds. As an example, one might contemplate an embodiment in which the application is an industrial bagel manufacturing system. In such an embodiment, the ingredients and the procedure required to first create the dough, then shape it into a ring, and then place it onto a conveyor all include elements whose simulation may be desired. State machine datasets may be elaborated as deemed appropriate, and encompass various values determined to be of value in the manufacture of a given product. Such simulations will be the result of constructed models, said models having been built upon previously measured and studied behaviors. The breadth and depth of such behaviors may be studied in whatever scope and with whatever granularity is deemed acceptable or necessary to successfully meet the objective of the target application or of a given embodiment of the invention.

In another embodiment, components and products may have state machines that include an ordered sequence of logical statements. This ordered sequence is required to set states within the state machines of various components and/or products within the system. The setting of such states may be useful to control or inquire function of actuators or of other components within the system. In another embodiment, a priority for the setting and execution of specific states may be established to ensure that the component or product operates as required.

In another embodiment, product state machine datasets include an ordered sequence of logical statements. This includes the ability to set states as a function of various criteria, as for example system component states, product states, or system component states, product states and time. In an embodiment, Control logic 2470 is expressed in the form of conditions (or states), each corresponding to a particular or participating within a particular action. In this scheme, it will be appreciated that the default action communicated to each actor in the system is that corresponding to no action, conferring a so-called "rest state" to each actor in the system so directed. These condition-to-action correspondences are placed into various a dataset sequences, further described herein. Other actuators and actors in the system are directed as a result of state information issuing from the simulators 2450, 2451, 2452, 2453 in combination with the Control logic 2470 described above. The above-mentioned control logic also enables the execution of the sequence of datasets' logical statements in such manner that later executed statements have priority in directing actuators over earlier executed statements. This is particularly useful for controlling automated equipment having multiple modes of operation. For example, a particular type of machinery might provide an automatic and a manual mode of operation, as well as various other modes, each having various operational particularities, and one might imagine for example the presence of maintenance, safety, and automated security modes. In an embodiment, it might be desirable to switch from one mode to another, for example from automatic to (a human-controlled) manual mode of operation, as might be required in an emergency. Such switching requires that the system know and manage the priority of each mode of operation under different sets of circumstances, and to be operative to undertake the proper sequence to transition from one mode of operation to another. In an embodiment of the invention, this may be implemented using "goto" (or "go to" or "go-to") actions ordered sequence of logical statements.

Go to Actions

To work properly, assembly charts (or state charts that track in real time the states of all systems that they control) actions may be of the "go to" type so that their result is independent of the initial conditions of the system, to allow the system to effortlessly resume operation should an operational halt be experienced. Such resumption is intended to occur irrespective of the mode of operation or of attendant system or environmental conditions. It will be appreciated that such real time state charts' own go to statements allow the system to direct transition to various positions or directions in instances other than those strictly related to recovery. The set of states of a state machine may be represented using any appropriate scheme. Thus the direction of a system's action can be determined by comparing the destination state with the current state. The result thus becomes independent of the initial conditions Direct Action Actions of the "go to" variety discussed herein are always necessary when a component is operable three or more workable positions. One might imagine, for example, a turntable having multiple operating positions, for purposes of rotating a product being manufactured into any of three or more set positions to complete said product's manufacture (or even to complete a single step).

However, in cases where a component has exactly two workable positions, a direct action can be requested. Scenarios such as directing a pneumatic cylinder or a two-position piston to achieve their fully extended or retracted position may be imagined as examples in this case. Such requests might be of the form "extend cylinder" or "retract cylinder" in the case of direct actions, as distinguished from the case of the turntable above having three or more positions, with each position in the "go to" case being achieved via a commands of the form "go to 0", "go to 45", "go to 90", "go to 180", and "go to 270". Sensors 2000 operative to measure or otherwise detect the presence or absence of specific conditions related to production are mounted throughout the production chain, and the information they detect and transmit is ultimately received by the one or several simulators 2451, 2452, 2453.

As a non-limiting example, it will be appreciated that in a further embodiment of the bagel production system discussed above, a given linear simulator 2453 may model the state of the bagel as it enters and travels through a conveyor oven to be baked. In a further embodiment, the percentage of doneness into a fully-baked bagel may be similarly modeled and simulated 2453 for each instance of a bagel candidate. Likewise, another simulator 2453 may simulate the presence of a ring of dough (with specific non-limiting attributes such as dimensions on the conveyor belt, mass, temperature and thickness of dough, as well as the physical and chemical response qualities of the dough's composition). Upon exit from the oven, it may be required that said bagel cool to a certain temperature prior to being packaged; in this case, which the simulator 2453 for said bagel may be operative to determine at what period following exit from said conveyor oven (or potentially at what conveyor distance from said exit) it may be considered desirable to package said bagel. Such considerations might include detection of the correct number of bagels in a given row of a conveyor prior to packaging, with such measures as causing the actual number of bagels on a given conveyor to appear within the simulator should any be missing from the conveyor for any reason, or whether the arrival of another bagel along the conveyor.

From the non-limiting example provided above, it will be appreciated that a similar series of task-specific actuators and simulators may operate to carry out additional or remaining portions of the bagel manufacturing process, such as packaging-related activities. It will also be appreciated that a modeling and simulation of the behavior of the product to be manufactured in addition to the actuators involved in said manufacture commensurate with ensuring that the quality objectives of the application are met.

The importance of a simulator being present for each product 2460 (and in an embodiment, a simulator being present for at least each instance or (specified) grouping of a product, such as a half-dozen bagels considered together) can thus not be understated. Likewise, the role of the control logic 2470 is also instrumental as such might include the precise actions to perform when the bagel is—variously—barely, partially, and fully cooked. Such actions may be provided by the various product states defined within the product state machine, with precise sequences of logical statements to execute to arrive at conclusions on such aspects as a baked product's doneness.

However, in another embodiment, product state machines may also include specific states operative to respond to operator commands and other manually-specified logical statements. Such functionality is particularly valuable when no existing execution procedure has been provided, or in cases where a human override of any automated portion of system behavior is required. Such human operator input may likewise apply to product states for all types of components present within the system, conveniently allowing for human input in cases where the system would be unable to continue to function properly without said human input.

In another embodiment, the logical statements that determine the execution of a particular system may be edited by a human following deployment of said system.

While the importance of accurate modeling cannot be understated in the present disclosure, it will be appreciated that while an embodiment of the present invention can be configured to make valid inferences based on sensor 2000 inputs and modeled behavior provided by one or more simulator 2450, 2451 2452, 2453, in some embodiments, it cannot infer details beyond the limited set of data provided by sensors 2000 connected to it. As an example, if in the bagel-manufacturing example discussed herein, no sensor were present (nor any sensor data available) to detect the presence of non-uniformity in the dough, said embodiment is not likely going to predict a defect resulting from said non-uniformity. However, in another embodiment, the opposite may be true, such as where a state machine dataset for a product or for a component might allow for automatic learning, for example, as a result of both actuator 2200, 2201, 2202, 2203 and sensor 2000 data, in tandem with previously discussed operator-controlled machinery.

Likewise, to promote and maintain accuracy it is typically desirable for the state machines of the various components of an embodiment of the invention to use models with a higher resolution (e.g. spatial) or granularity than that of discrete sensors involved within said embodiment. For example, the increased resolution is one aspect of the state observer, mentioned herein.

Nonetheless, it is not the mere ability of embodiments of the present invention to respond to variable states of actuators 2200, 2201, 2202, 2203 and other actors and components that provides said embodiments' major advantage over prior art systems. Rather, it will be appreciated that the purpose of reading sensor inputs 2000 may be understood with a view to synchronizing a simulator, with actuator states being taken from simulators and transposed onto real actuators, as will be further discussed herein. In this manner, the set of simulators appear to be involved in a mere simulation of a virtual world—a situation that is accurate when the simulator interface is not communicating with actuators present in the system. However, said simulators are typically exploited to do just the opposite, as in many embodiments, they are interfaced with real-world sensors and control logic signals typically do output electrical signals to control actuators.

Control Logic

Figure 4:
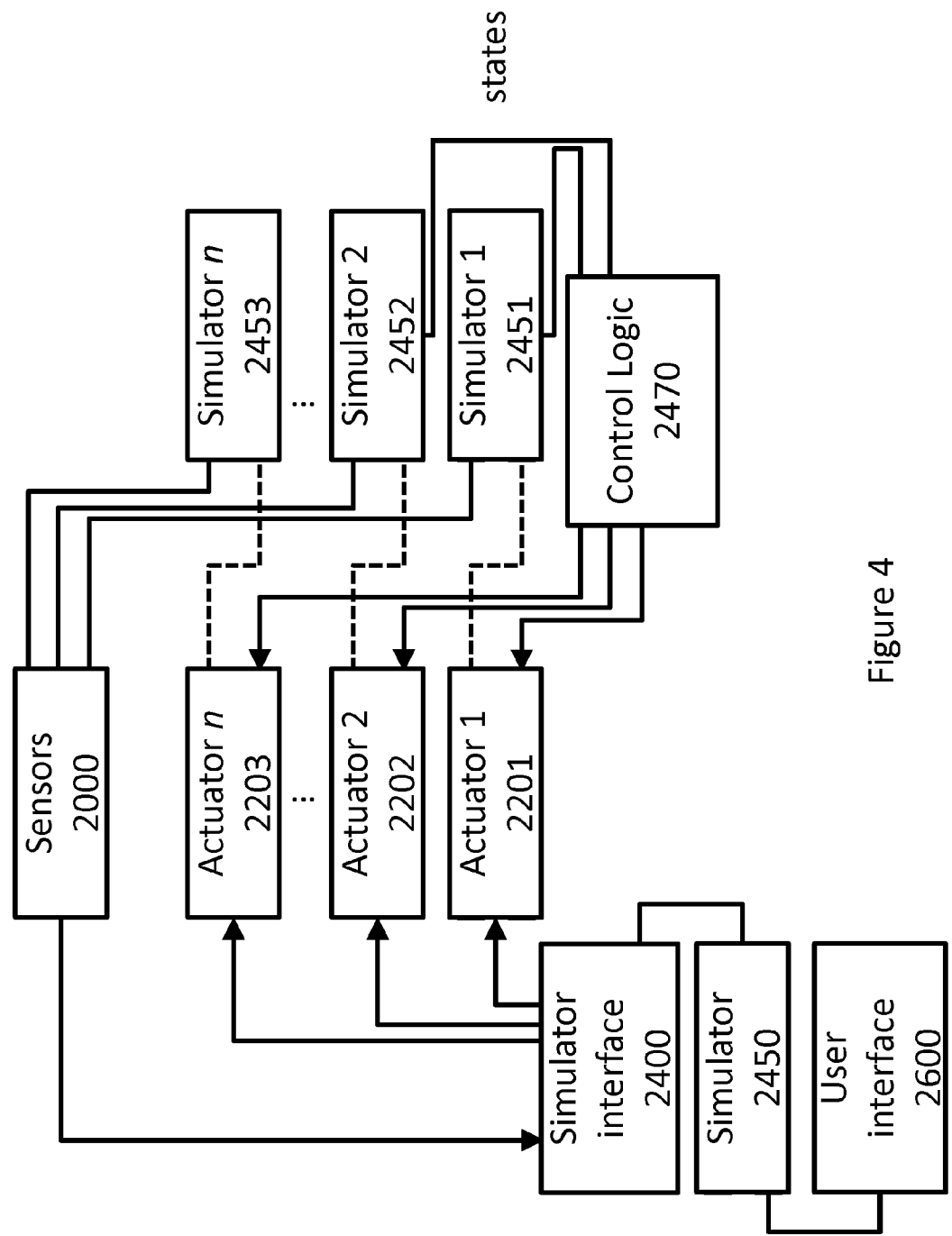
FIG. 4 is another layout view of another embodiment of the system, which includes a user interface, simulator, simulator interface, sensors, control logic, actuators, and simulators to model the states and behavior of said actuators.

The Control logic 2470 module functions as a command structure between the simulators 2450, 2451, 2452, 2453 and actuators 2200, 2201, 2202, 2203 of an embodiment of the invention. Although it may be implemented variously in different embodiments of the invention, the command structure fundamentally obviates the need to add programmable logic (such as through a PLC). In an embodiment of the invention, the Control logic module 2470 sets the states of the actuators 2200, 2201, 2202, 2203. With reference to FIGS. 3 and 4, sensor signals 2000 do not generally connect to the Control logic module 2470, but are instead routed back to the simulators 2451, 2452, 2453, 2460. (One notable exception to such direct connection might include the case in which a sensor 2000 detects the occurrence a particular safety condition and in such cases is allowed to override the mode of operation of an automated system, switching the system from automatic to human-controlled manual operation immediately). In this way, a simulator 2451, 2452, 2453, 2460 might obtain information, for example, about positioning, from a sensor signal 2000. As a result of this information received from the sensor 2000, the simulator 2450, 2451, 2452, 2453 updates the position information, following which the Control logic module 2470 determines its next decision and outputs simulated control signals intended for the actuators 2200, 2201, 2202, 2203. Thus, a projection in virtual space of objects handled by an embodiment of the present invention can be maintained by the Control logic module 2470 so as to manage the expected position of the objects within an automated control system. In addition, and as is further developed herein, the Control logic module 2470 oversees and directs the execution, in priority, of a sequence of statements. The role of go to statements, further described herein, will further be appreciated in the accomplishment of this endeavor.

States and Recovering From a Temporary Operations Stoppage

As discussed variously herein, an important aspect of embodiments of the present invention concerns carefully managing the states of all actuators 2200, 2201, 2202, 2203 and other components of the system. In addition to its general importance in the regular operation of an embodiment of the present invention, maintaining such data is particularly valuable for recovery following slowdown of one or more of its constituent sections or components, or even suspension or interruption the said embodiments' operation. Considering once again the bagel-making operation discussed previously, suppose it were necessary to temporarily bring an operating the production line to a halt, resulting in the immediate slowdown of the various components in the chain. Such suspension of automated system might occur, for example to make a change in either the products or in one or more components within an automation system. Consider also the events surrounding the resumption or restarting of said production line. As an extension to the combined effects of sensors and state information that can be simulated, embodiments of the present invention may, upon restarting of the production chain, continue as appropriate because the state of each bagel is sensed, tracked, and known via simulation. The resulting state of all or a portion of the batch of bagels previously subjected to the temporary shutdown—and whose (potentially respective) levels of doneness are known—being known to the simulation modules, it is possible for embodiments of the present invention to likewise simulate, and thus direct or control the system as to as to the specific steps to take to fully recover. For example, the temperature of the conveyor oven might be set higher than usual, to account for the previous slowdown, or alternatively the conveyor for a segment of bagels whose cooking was in progress at the time of the shutdown might, upon restart, be slowed to properly accommodate the temporary anomaly, leveraging the more robust controls offered by the structure of embodiments of the present invention in such a manner as to recover the entire batch of bagels in its entirety, thus avoiding the risk of unnecessary rejection of any or all bagels in said batch which may otherwise be safely and successfully recovered.

Thus, any element or consideration, whether fixed or variable, but potentially able to impact on the quality of the product or result produced by an embodiment of the present invention, should be simulated. Both the existence of a simulation model as well as the latter's inherent accuracy make it possible to apply the known model to a given real-world environment and facilitates recovery whenever said complex production environment is temporarily paused and subsequently restarted. Recovery possibilities described herein are made possible by the knowledge of the states of all key elements in the production line, namely those relating, on the one hand, to the position of actuators 2200, 2201, 2202, 2203 and other components of the line itself, as well as those of the products that the production line is intended to manufacture, on the other.

It will be appreciated that the notion of "state" as discussed herein differs appreciably from the notion of a step in an SFC as is known in the art. Rather than conceiving of individual steps within which associated actions are carried out, and then transitioning to other steps upon associated logic conditions, "states" operate on both the basis and outcome of simulators' operations. Specifically, each simulator operation results in further consideration of the system of the state in which the previous action has placed the system in. Unlike the case prevalent in PLC-based prior-art solutions, determination of state falls outside the scope of mere control logic, and as a result, accurate results may be obtained.

Furthermore, the role of user interface is increased within the present invention as a result of the offline mode discussed earlier. The offline mode functionalities allow a user—whether a human operator, highly skilled technician, or dedicated system developer—to experiment with various aspects of the system, including simulating hypothetical situations, and optimizing such aspects. Embodiments of the present invention allow for such optimization to take place either when the system is first deployed or anytime thereafter.

In another embodiment, it is possible to detect, glean, or otherwise deduce whether one or more sensors deployed within a real-world machine automation system are defective by comparing, using system control logic, the behavior of said sensors' corresponding simulation behavior with information received from said sensor.

Acceleration and Linear Simulators

It will be appreciated that linear simulators in the context of embodiments of the present invention are understood to be far more than simple timers. Instead, they should be appreciated for the possibilities they offer to determine a state, by integrating a given parameter over time. For example, heating power minus heating losses may be integrated to provide temperature.

Likewise, acceleration or velocity of an actuator 2200, 2201, 2202, 2203 might likewise be doubly integrated or integrated, respectively, to determine position information with far greater accuracy following rapid start and stop of moving parts such as motors or conveyors within a given system. Such position information is typically of appreciably greater accuracy than a timer-based implementation that merely depends the time period during which a motor (or attendant conveyor) has either begun or ceased operation to determine the position.

In another embodiment, a component or a product's states may additionally include variable position data obtained from various sources. As a non-limiting example, such data may be introduced from such sources as sensors 2450, 2451, 2452, 2453 and/or be received from a human operator defining position states, with the position data obtained through calculation.

Preventing Inadvertent Race Conditions and Catchup

Proper interaction between sensors and control logic is not simply a desirable aspect, but rather is a key consideration in embodiments of the present invention. The dynamic by which simulators 2450, 2451, 2452, 2453 are notified of actual system conditions from sensor 2000 readings and as a result said simulators 2450, 2451, 2452, 2453 model and direct actuators 2200, 2201, 2202, 2203 in a manner consistent with the requirements of a given application has been discussed herein.

This dynamic may be thought of as a somewhat sophisticated control system exercise wherein the simulated system and real-world system should strive to be faithful mutual counterparts to the greatest possible extent, with neither counterpart leading or lagging the other beyond an extent tolerable for the purposes of the application at hand. As a corollary, both counterparts are essentially involved in a catch-up exercise with one another: the real-world variant constantly supplying sensor data of actual system conditions to its simulated counterpart, and the simulated system constantly providing directions to its real-world counterpart as to how to how the latter may reach idealized, modeled behaviors.

Within this dynamic, a noteworthy case deserving discussion is one in which an actuator 2200, 2201, 2202, 2203 or other component is required to perform a particular action only once. As an example, one might imagine a pastry-making application in which each pastry to be manufactured must receive exactly one cherry, with said cherry to be placed at a specific location at the very top of the pastry, and with such placement occurring only once the pastry has reached a specific position along the conveyor. It will be appreciated that the model simulating the pastry itself 2460 will be updated to reflect the presence of the cherry once the actuator 2203 responsible for carrying out such action will have completed the placement task. Issues arising from improper operation on this point, in addition to potential solutions that an embodiment of the invention might provide, will be discussed shortly.

It will be appreciated that particularly demanding control logic 2470 is required to fulfill this specific requirement—in some embodiments far more challenging than what is required, for example, to dynamically change the temperature of a conveyor oven in response to a suddenly cooler factory or alternatively to a new batch of products to process through a conveyor oven, the products having different thermal qualities than the previous or successive batch. This is because in the context of the ongoing parallel catch-up dynamic occurring between both simulated and real-world counterparts, it is possible to encounter undesirable and unpredictable actuator behavior 2200, 2201, 2202, 2203.

Figure 5:
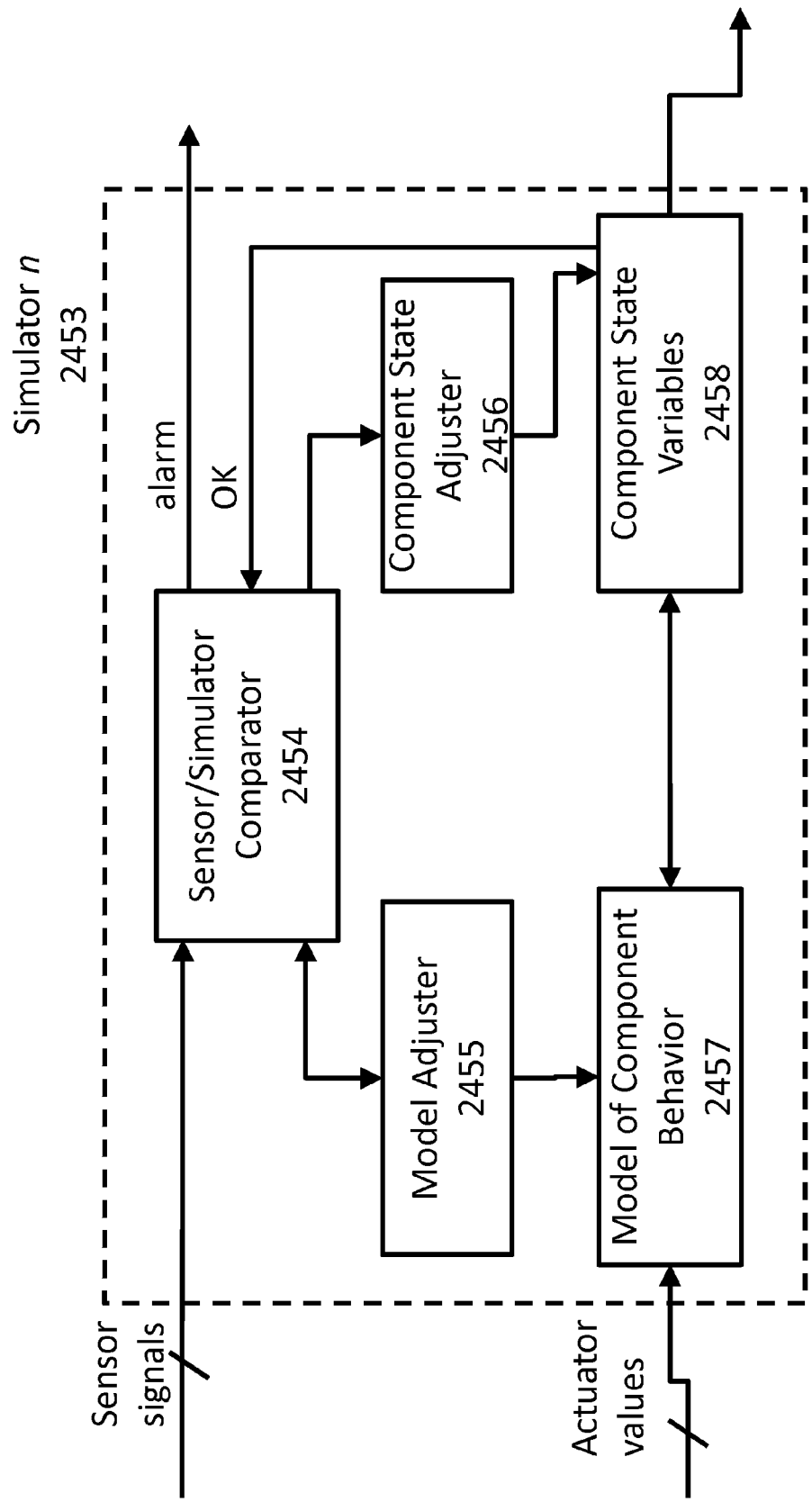
FIG. 5 is a detailed view of the internal components of a simulator module of the type shown in FIG. 3 and FIG. 4.

Consider the one-cherry pastry manufacturing scenario introduced above, wherein a single cherry is to be deposited onto the surface of the pastry as said pastry reaches a specific position on the conveyor. This is known as a critical state. Consider one scenario, in which a pastry reaches said position and a cherry is deposited at its top. Consider that concurrently, within the simulator, information about this action has not yet been received by the sensors. One (undesirable) outcome of this might be that the simulator might direct the cherry-depositing actuator to place a second cherry onto said pastry before said simulator processes the fact that said pastry already contained a cherry. This is a race-like condition, and is to be avoided. Specifically, in order to perform an action, the way in which the simulator will use the sensor signal to synchronize with the real-world actuators, adjustment would need to be made in a manner that does not trigger an extra control logic response by backing something up. Furthermore, alarm signaling plays a vital role within an embodiment of the invention to indicate the presence of a significant disparity between real-world observations and those expected by simulator 2453 model(s) applicable to a specific situation when operating in online mode. FIG. 5 shows the modules within a simulator involved in detecting and reacting to such disparities. It will be appreciated that this is distinct from the situation which prevails when working in offline mode wherein alarm signaling is turned off as previously mentioned herein. In online mode, the simulator 2453 receives as inputs values from one or more sensors 2000 within the system. Values in the form of variables, such as temperature and position are provided to the simulator's 2453 Sensor/Comparator module 2454, which assesses the real-world value against and the value expected by the simulator's 2453 own model. It will be further appreciated that such assessment is typically done for numerical values as opposed to on/off state values. If the real-world value falls, within a given range or alternatively within a margin of the value expected by the model, the model is adjusted 2455 accordingly, either replacing the previous expected value, or modifying the latter through some situation-appropriate algorithm to bring it closer in line with the value received and thus safely respond to the system's operational reality. The component's modeled behavior 2457 is accordingly adjusted in such cases. On the other hand, the alarm will be activated when a deviation between the value received from the sensor exceeds the set range or margin discussed. In an embodiment of the invention, the component state adjustor 2456 is notified of the wider deviation, and a human operator may intervene as a result of the alarm to assess whether to adjust the component's state 2458. In another embodiment, performance trends may be tracked and recorded over a longer period so as to detect changes over a longer period that would otherwise be imperceptible on a day-to-day basis. For example, a slowdown of a conveyor's maximum speed might signal the need for maintenance to be performed, in which case an alarm may ultimately be generated. In an embodiment, such an alarm may simultaneously comprise notification to key factory staff regarding the necessity to variously perform said maintenance, procure said part, or any additional action required to restore ideal operation. In different embodiments, the Model Adjuster 2455 may or may not direct the Model of Component Behavior 2457 to adjust the model(s) for said conveyor part(s) in response to said disparity and alarm.

In another embodiment of the invention, the Model Adjustor 2455 filters the differences recorded in the comparator 2454 and said update is subsequently reflected in the model of component behavior 2457. It will be appreciated that in certain cases, the instruments used to carry out detection and sensing 2000 may be subject to variability and imprecision in the execution of their duties. Such disparities may in some scenarios be attributed overwhelmingly to the instruments themselves and far less (if at all) to the real-world operation underway. As a result, any update between the model adjuster 2455 and its corresponding model of component behavior 2457 occurs in iterative steps. In the course of such iterative steps, the value(s) expected by the model of component behavior 2457 are brought in line with (or in another embodiment, merely closer to) value(s) recorded by sensors 2000, rather than causing values in the behavior model 2457 to immediately match those values detected 2000. This is done to mitigate any risk that disparities arising from instrumentation might cause the component's behavior model 2457 to be radically (or even modestly) adjusted unnecessarily—where taking into account such a situation might otherwise be entirely unwarranted. As is the case with many issues that arise in industrial automation environments, an embodiment of the present invention is likely to encounter operational problems which may broadly be attributed, on the one hand, to sensor failure (or instrumentation-related shortcomings more generally), or the actual occurrence of a real-world issue (such as an operational deficiency, actuator or wider mechanical failure of an assembly line), on the other. It will be appreciated that mechanisms to address such issues—when they occur—should be provided within an embodiment of the present invention in an effort to comply with the broad improvement and operational objectives described herein.

Scenarios

Returning to an embodiment featuring a cherry and pastry example described earlier, one can imagine, on the one hand, a first scenario in which a cherry is not deposited upon the pastry. Such an issue might occur, for example, as a result of a real-world issue encountered on the assembly line, such as actuator 2203 failure, or a shortage of cherry supplies. In such a case, the model of the pastry within said pastry's product simulator 2460 is updated to indicate—albeit inaccurately—that the cherry is present, even though said pastry's real-world counterpart lacks said cherry.

In another embodiment, one might envision a second scenario in which the cherry is indeed correctly placed onto the pastry, but in which said cherry's presence is not detected by the appropriate sensor 2000. As a result of said sensor's 2000 failure to faithfully detect the real-world state of the pastry and transmit it to the appropriate product simulator 2460, the simulator's internal model 2460 will once again detect—inaccurately—a situation wherein the situation reported to and indicated in the model is at variance with the real-world events occurring on the product line.

Alarm Response

In either of the two foregoing cases, an alarm signal may be issued by the product simulator 2460 to warn the operator, some other individual, or any other responsible entity of the apparent mismatch between expected simulator 2460 observation and real-world input observations provided by way of sensors 2000. In such cases, appropriate measures may be taken by said responsible entity. In an embodiment, the operator may choose to perform an situation of the real-world automation scenario visually inspect the target, for example, (temporarily) compensate for this by visually inspecting the products coming off the line and in a further embodiment actuate the cherry-depositing mechanism for each pastry.

As a result of such problem scenarios, a human operator might first perform a visual inspection of the real-world production line in an effort to determine whether or not a cherry is actually present on the pastry. Should no pastry be present, such as in the first scenario laid out above, said operator may update the pastry's model 2460 to indicate the real-world situation, namely, the absence of a cherry. In an embodiment, the Control logic 2460 may intervene as a result and direct the appropriate system actuator(s) to place a cherry upon the pastry.

In the second scenario, said human operator might once again perform a visual inspection of the actual production line, concluding in this case that the reason for which the "no cherry" case was triggered was because of a faulty or permanently defective sensor 2000. In this case, said operator does not update the pastry's product simulator's because 2460 because the problem at issue in the second scenario does not pose a problem with the model 2460 itself. As a result, said operator might attempt to correct or repair the cherry-detection sensor 2000.

In one embodiment, should the operator be unable to repair or correct the sensor 2000 immediately, he may declare said sensor defective 2000 and nonetheless allow continued operation of the product line, the operator having ultimately determined which of the two broad scenarios above has occurred. In either case, once this determination has been made, said operator may take (and/or delegate) responsibility for said problem's resolution. For example, in the scenario in which the cherry is not physically present on the pastry, the operator may use the system's User interface 2600 to access the model for said cherry's product simulator 2460.

Upon said access to the user interface 2600, the operator may modify the product model 2460 in such manner as to indicate the absence of the cherry. In some embodiments, the user interface 2600 may include comprehensive GUI elements to facilitate such addition, removal, or modifications of various aspects of the system operation, such as in the foregoing. Alternatively, the operator may conclude that the issue occurred as a result of the sensor 2000 having failed, in which case said operator may take further action to correct the sensor 2000 issue (such as repairing, delegating said repairs to an authorized party). In a further alternative, said operator may instead determine that a sensor 2000 failure has indeed occurred and nonetheless continue operation, having formulated or adopted a modified operation policy to be followed until a definitive resolution of the real-world is completed.

Although the alarm discussed in the foregoing examples has been described as being issued by the product simulator 2460, it will be appreciated that in other scenarios and embodiments, particularly those in which a failure does not directly affect the manufacture or completion of a given product, that an alarm may be similarly issued by any other simulator 2453.

Likewise, the scenario in which a pastry moves past the target position on the real-world conveyor too quickly and receiving no cherry—all while the simulator assumes that said cherry has been properly deposited—is equally problematic.

In both cases of drift between simulator and real-world setup discussed above, the solution consists of elaborating, for all such critical trigger positions, a synchronization catch-up mechanism that ensures that only one such that the control logic will never skip and miss a critical trigger position. It will be appreciated that if no sensor 2000 or group of sensors 2000 is present to determine (or indirectly reconstruct a solution for) a particular operational issue, the model may not be easily updated autonomously. In such cases, an additional sensor 2000 or group of sensors 2000 may be added to the system. In a further embodiment, the use of a camera may be envisioned to partially compensate for such shortcomings.

In another embodiment of the present invention, part or all of the elements described in a non-limiting manner herein, as well as other permutations thereof, may be implemented in whole or in part on one or more processors. In another embodiment, said processor(s) may instead be one or more computers, tablets, or other similar devices, each operating either independently or networked variously.

While the example scenarios presented thus far have featured case studies in which a cherry is either present, absent, or mistakenly observed as either present or absent, an intermediate scenario may be further contemplated. It will be appreciated that such a scenario may feature a situation in which said cherry is indeed present and accurately detected, but in which the specific cherry placed atop a specific pastry is of poor quality. In this scenario, it is assumed that no prior fruit quality inspection phase or action has been carried out. In an embodiment in which this intermediate scenario is contemplated, two essentially concurrent events may occur at an operational level within the system being presently discussed. On the one hand, the human operator may cause the poor quality cherry to be physically removed from the pastry (whether by mechanical or other means, such as through direct and physical human intervention) and the cherry thus rejected may be discarded. On the other hand, such removal may be concurrently reflected in the pastry model within the product simulator 2460. It will be appreciated once again that such a change in the pastry model 2460 may be reflected through operator intervention to indicate the absence or removal of said cherry. Such intervention may include an action in which an operator uses GUI functionality made available through the User interface 2600, for example, to toggle (off, in this case) the presence of the cherry. As a result of these two concurrent actions (mechanically removing cherry and indicating cherry absence via user interface 2600), the automated product assembly line may, in an embodiment, cause a new (and acceptable quality) cherry to be subsequently placed on the pastry. In another embodiment of the present invention, said pastry might instead be declared defective in its entirety if a cherry replacement procedure akin to the one described above is impossible.

Contents Product Simulator Information

As discussed herein, in an embodiment of the invention, the Product simulator 2460 plays a key role in ensuring that the manufacturing process for the product under consideration unfolds successfully. Various information about the condition of the product throughout its manufacturing process must be variously collected, validated, consolidated, and updated to do so. A non-exhaustive discussion of the types of information stored for such purposes will be undertaken presently.

It will be appreciated that in an embodiment of the invention, the Product simulator 2460 may contain a register in which the real-world position of the product is stored. It will be further appreciated that said real-world position may be stored using any scheme, including without limitation, integers, real numbers, GPS coordinates, or physical position marker identifiers. Furthermore, said positioning may reflect any of multiple dimensions (defined in accordance with the manufacturing objectives of an embodiment of the invention). Likewise, such positioning information might also use as its basis the progress of a given product as it traverses the various manufacturing stages along its assembly line. In a further embodiment, one or more Boolean registers may be present. Said Boolean type register may serve to determine whether (or not) a product has reached one or more given real-world position(s). The Boolean nature of the information serves to determine whether or not further actions or events—which may occur or be taken only when said product is at a specific position—may proceed. It will be appreciated, for example, that the cherry placement upon a pastry must occur at a specific point in said pastry's manufacture—and typically at a very specific position on the conveyor. In an embodiment, a register may indicate not merely the physical progression along the entire automated process, but the progress indicating a percentage of completeness of the product. In an embodiment of the invention in which products' dimensions may vary, register data stored in the product simulator model 2460 may also contain dimensions of the products. In another embodiment, if multiple sequential operations are to be performed on the product (for example, a pastry manufacturing process comprising the steps of cooking, cream insertion, cherry placement, separating into groups of 6, and packaging in box), a state machine within the product simulator model 2460 may be used, keeping track of each operation enumerated above, to reflect the progression in the sequence.

In another embodiment, the product simulator model 2460 may also contain independent states to describe, for example the quality category of the product to manufacture. As a non-exhaustive example, such independent quality category states may include: product passed, product rejected, product defective, product to be refurbished, and others. In an embodiment of the invention in which different types or variants of products may be manufactured on an assembly line, and wherein different operations must further be performed, the product simulator model 2460 may contain a register to identify the type or variant of product, so that various workstations may carry out operations required to correctly manufacture each product variant. In another embodiment in which the product to manufacture is a combination of subproducts or subassemblies in which the latter may be executed in any sequence, product simulator 2460 may contain states for each of the subassemblies of the assembled product. In an embodiment, the product simulator 2460 may contain traceability information which would allow for the implementation of one or more traceability standard (such as ISA-88).

Development and Programming

It will be appreciated that embodiments of the present invention require prior development and configuration in order to operate. Such development and configuration steps are as variable as the applications to which embodiments of the present invention may be dedicated. A discussion of the various considerations when developing different aspects for an embodiment of the invention will be discussed presently. Such aspects may non-exhaustively include configuration and development of parts of a simulator 2453, control logic 2470, and user interface 2600 modules further described herein.

A first aspect might include writing necessary aspects of each simulator 2453 manually. Such steps consist of developing a state observer for each of the components, developing product information (metadata) for each product to be manufactured within a given automated product line, developing the sequence of statements (further described herein) for each component and actor within the system, and finally, developing a user interface 2600 that allows a human to operate/control the system and visualize the states of simulators 2453 in addition to editing the states of simulators 2453 during operation. It will be appreciated that all such steps are manual, with no external assistance available (or provided) of any kind. It will further be appreciated that in the current state in the art, one may make use of development systems, or alternatively develop or use a system to help programming.

Under a second aspect, if mechanical drawings exist, it may be possible to extract the user interface of said system actor on the basis of existing drawings. If not, in another embodiment, a generic interface (or set of templates) may be provided for the same purpose.

Under a third aspect, if electrical drawings exist, the database of actuators and sensors may be extracted from the database of said drawings (at least for sensors and actuators).

A fourth aspect of development for an embodiment of the present invention involves the reverse engineering of any type of system actor discussed herein. Such reverse engineering is carried out through a sampling of said system actor's input and output signals over a sufficiently long period. A first point of consideration to perform such reverse engineering requires that the system actor (sensor 2000, product 2460, simulator 2453, control logic 2470, user interface 2600) be considered and studied independently of its operation within the system and outside the context of any specific operational load, application, or active task. Consider, as an example, the reverse engineering of a part moved by a linear actuator 2203 (for example, a variable speed drive that drives a worm drive upon which a moving mechanism is mounted), the course of whose entire operation is detected by a total of three discrete sensors. Consider further that information on the speed of the actuator 2203 is supplied, for instance, by a variable speed drive or some other speed detection device, such as an encoder or a camera. With this information, and with study of the operation of the actuator 2203 over time, it is possible to determine a speed pattern of the actuator in all its operational directions. As a result of the speed pattern thus determined, it will be appreciated that a state observer for the corresponding system actor may be directly generated in an embodiment of the invention using bounded differential equations. From here, it is possible to deduce the position of the moving part of the actuator as detected by events triggered at the discrete sensors placed along the full range of said actuator's movement, Consider a similar system, but with no information available or provided regarding speed. In this case, although forward and reverse speeds may differ among one another, it is assumed that each of the forward and reverse speeds of the actuator 2203 is constant. Further, the distance separating the mounted discrete sensors 2000 is known (or may be determined relatively easily). Comparing the time required for the actuator 2203 to complete two events in the forward direction as well as those same two events in the reverse direction makes it possible to determine the relative forward and reverse speeds. From this information, it is possible to deduce the relative position of the moving part of the actuator at any given time. As was the case previously, it is possible to deduce the position of the moving part of the actuator 2203 as detected by events triggered at the discrete sensors 2000 placed along the full range of said actuator's 2203 movement.

Assuming the discrete sensor 2000 is known to turn on when forward direction is detected and turn off when reverse direction is detected, it is possible to discriminate linear from rotary actuators 2203. This may be done by simply counting the number of occurrences of one event in each direction. In so doing, it is useful to observe the typical usage scenario, wherein actuators 2203 having on a rotary movement typically operate in one direction whereas the movement of actuators 2203 having a linear character typically extend and retract in the course of their operation. This observation may be exploited in such manner as to deduce that if the count of "forward" occurrences minus "reverse" occurrences tends toward zero for a given actuator 2203, said actuator 2203 has a linear movement. Conversely, if the difference between forward and reverse occurrences tends toward infinity with time, said actuator 2203 may be said to have a rotary movement.

To be able to undertake the process described above, it is necessary to identify the actuators 2203, the discrete sensors 2000, direction of movement, and (if available) Instantaneous speed information of a component.

Another aspect concerns re-engineering a transport line. A transport line may comprise more than one conveyor. To reengineer a transport line, it is necessary to determine the relative length of each distinct conveyor and the relative speed of operation of all actuators 2203 on each conveyor. This may be achieved by measuring the speed ratio for a variable drive or the forward and reverse speed of an actuator 2203 (such as a motor) using a contactor (e.g. an on/off switch). The combination of the two conveyors becomes a non-linear system as a result of the two actuators 2203 in each conveyor being distinct from one another; however, this transport line may be linearized by considering active actuators 2203 on each portion corresponding to each conveyor. If both conveyors are thus turned on and a product transits in turn on both conveyors, it will be appreciated that the result may be considered to form one single linear system. In this case, as in previous examples, it is possible to determine all event positions for all discrete sensors along said transport line.

Further to the reverse engineering efforts just described, specific templates may be generated for all components and transport lines to be used in the user interface.

Grouping all components of one workstation and sampling signals of all these components on a full cycle of the workstation make it possible to determine which component(s) is/are used, the sequence of use of said components, and the stop position of all components in the cycle. From this, it is possible to reverse engineer the control logic 2470 of a workstation by generating a sequence of go to state positions. Said sequence consists essentially of a list of cascaded and dovetailing go to state positions. It will be appreciated that if one component is used more than once to produce the result of the workstation, a temporary bit will be switched on at every second use of said component in a scheme to indicate whether past usage of said component has been made.

What is claimed is:

1. An apparatus for automated control of a system having a plurality of cooperating components involving controlled elements and sensors, the apparatus comprising:
a simulator configured to simulate operation of said components, said simulator storing data representing states of said components and configured to modify said states over time in accordance with simulated operation of said system;
an input module receiving data from at least said sensors and configured to update in said simulator said data representing states of said components; and
an output module reading from said simulator said data representing states of said components and configured to generate at least controlled element control signals for said controlled elements of said components,
wherein said simulator contains a virtual state machine representing said system, and automation of said system is achieved without state machine logic representing said system within said input module and said output module,
wherein said simulator comprises:
one or more automated control system component simulators configured to generate said data representing states of said components using a dynamic model of a automated control system component;
one or more product component simulators configured to generate data representing at least one state of a unitary product or component thereof made by said automated control system; and
control logic configured to respond to said data representing said states of components and to said data representing said at least one state of a unitary product or component thereof to generate data representing states of actuators associated with said components,
wherein said control system component simulators and said product component simulators comprise said input module and are configured to receiving data from at least said sensors and to update in said component simulators said data representing states of said components.

2. The apparatus as defined in claim 1, wherein said control logic is configured to:
execute a sequence of logical statements in a predetermined order of priority such that later executed statements have priority for setting states over earlier executed states; and
said output module is configured to control said actuators of said system in accordance with said states as set following executing of all statements, wherein said executing can be continually repeated to control said system to manufacture said product.

3. The apparatus as defined in claim 2, wherein said control logic is configured to provide a non-automated mode of operation, wherein said component and/or said product states further define operator command states, said sequence of logical statements include manual control logical statements, and said executing causes said system to follow operator command.

4. The apparatus as defined in claim 2, further comprising an input device configured to accept operator input to adjust one or more of said component and/or said product states not directly related to data obtained from said sensors, wherein said executing can continue automated operation of said system following said operator input.

5. The apparatus as defined in claim 1, further comprising:
a user interface configured to provide an operator with system operation information, to accept operator input to control system operation, and to accept operator input to disable operation of said input module and said output module and to observe simulated operation of said system.

6. The apparatus as defined in claim 1, wherein said controlled elements include mechanical actuators.

7. The apparatus as defined in claim 1, wherein at least some of said component simulators are configured to adjust parameters of their dynamic model using an analysis over time of said sensor data.

8. The apparatus as defined in claim 7, wherein said component simulators are configured to generate an alarm when adjustment of parameters of their dynamic model exceeds a predetermined threshold.

9. The apparatus as defined in claim 1, wherein said input module is configured to generate an alarm when a difference between said data representing states of said components and a corresponding value determined from said sensor data is greater than a predetermined threshold value.

10. The apparatus as defined in claim 9, wherein said input module is configured to generate said alarm without updating said data representing states of said components.

11. A method of manufacturing a product using automated machinery having system components including actuators and sensors, the method comprising:
    recording in a computer signals from said actuators and said sensors during operation of said automated machinery or a simulator of said automated machinery using manual control or a first automated control system;
    generating state machines for said components based on said recorded signals;
    defining product state machine based on the complete life cycle of a product along the process, preferably including defining a product information path of said product information based on said product path;
    wherein said state machines for said components and said product state machines form together simulator logic;
    generating, using said recorded signals, automatic command logic for said automated machinery using said state machines for said components and said products, said automatic command logic defining operation of said system components as a function of a state of a group of said components or products or product components handled by said system of components;
    generating a user interface for said automated machinery that permits an operator to suspend operation of said automated machinery, change said state of products or product components handled by said system of components, and resume operation of said automated machinery taking into consideration said change;
    executing said simulator logic using at least said actuators signals generated during operation of said automated machinery using said first control system to produce test sensor signals;
    comparing said test sensor signals with said recorded sensor signals to correct, if required, said simulator logic, said simulator logic being validated;
    executing said automatic command logic using as input at least said sensors signals generated during operation of said automated machinery using said first control system to produce test actuator signals;
    comparing said test actuator signals with said recorded actuator signals to correct, if required, said automatic logic, said automatic command logic being validated;
    connecting at least one processor executing said validated simulator and automatic command logic and said user interface to said system components including said actuators and said sensors; and
    controlling said automated machinery to manufacture said product using said validated simulator and automatic command and said user interface.

12. The method as defined in claim 11, wherein said executing and said comparing are performed using signals recorded from said actuators and said sensors during operation of said automated machinery or a simulator of said automated machinery using manual control or a first automated control system, wherein said signals used for said executing and said comparing are different from said signals used for defining said state machines.

13. The method as defined in claim 11, wherein a projection in virtual space of objects handled by an automated system is maintained by said control logic system so as to manage the expected position of the objects within an automated control system.

14. The method as defined in claim 11, further comprising detecting when a sensor is defective and using a simulation of said defective sensor done by said control system logic.

15. The method as defined in claim 11, wherein said state machines use spatial models having a higher spatial resolution that a resolution of sensors in said automated machinery.

* * * * *